US010341927B2

(12) United States Patent
Droste et al.

(10) Patent No.: US 10,341,927 B2
(45) Date of Patent: Jul. 2, 2019

(54) VEHICLE WIRELESS UNIT AND METHOD OF OPERATING THE SAME

(71) Applicant: GM GLOBAL TECHNOLOGY OPERATIONS LLC, Detroit, MI (US)

(72) Inventors: Scott T. Droste, West Bloomfield, MI (US); Khaled Rabbah, Canton, MI (US); Sanja Laptosevic, Windsor (CA); Chalan Munasinghe, Ann Arbor, MI (US); Rahgul G. Padinjarethil, Farmington, MI (US); Ajay Shrivastava, Farmington, MI (US); Paul R. Williams, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 15/654,884

(22) Filed: Jul. 20, 2017

(65) Prior Publication Data

US 2019/0028948 A1 Jan. 24, 2019

(51) Int. Cl.
*H04W 36/32* (2009.01)
*H04W 4/70* (2018.01)
*H04W 76/30* (2018.01)
*H04W 36/36* (2009.01)

(52) U.S. Cl.
CPC ............ *H04W 36/32* (2013.01); *H04W 4/70* (2018.02); *H04W 36/36* (2013.01); *H04W 76/30* (2018.02)

(58) Field of Classification Search
CPC ..... H04W 24/10; H04W 48/20; H04W 76/28; H04W 36/0016; H04W 36/0061; H04W 36/0088; H04W 36/14; H04W 48/18
See application file for complete search history.

(56) References Cited

U.S. PATENT DOCUMENTS

| 2002/0061002 A1* | 5/2002 | Nitta | H04L 69/16 370/338 |
| 2005/0020297 A1* | 1/2005 | Axness | H04B 1/0057 455/552.1 |
| 2006/0183482 A1* | 8/2006 | Ueda | H04W 36/0061 455/439 |
| 2007/0270140 A1* | 11/2007 | Islam | H04W 76/38 455/423 |
| 2009/0209256 A1* | 8/2009 | Nakashima | H04W 36/0088 455/436 |
| 2010/0322217 A1* | 12/2010 | Jin | H04W 60/00 370/338 |
| 2013/0143615 A1* | 6/2013 | Juang | H04W 52/0222 455/522 |

(Continued)

*Primary Examiner* — Matthew C Sams
(74) *Attorney, Agent, or Firm* — Reising Ethington, P.C.

(57) ABSTRACT

A vehicle wireless unit and a method of operating the same. The vehicle wireless unit and method may be used to temporarily halt a non-interrupted data flow between the vehicle wireless unit and a cellular network over a first cellular link according to a first radio access technology (RAT), which purposely causes the vehicle wireless unit to enter an idle mode and results in the first cellular link being released. Once the first cellular link is released, the vehicle wireless unit and method may search for and, if found, establish a second cellular link with the cellular network according to a higher-order radio access technology (RAT). The vehicle wireless unit and method may be particularly useful with autonomous or semi-autonomous vehicles.

14 Claims, 2 Drawing Sheets

(56) References Cited

U.S. PATENT DOCUMENTS

Figure 1:
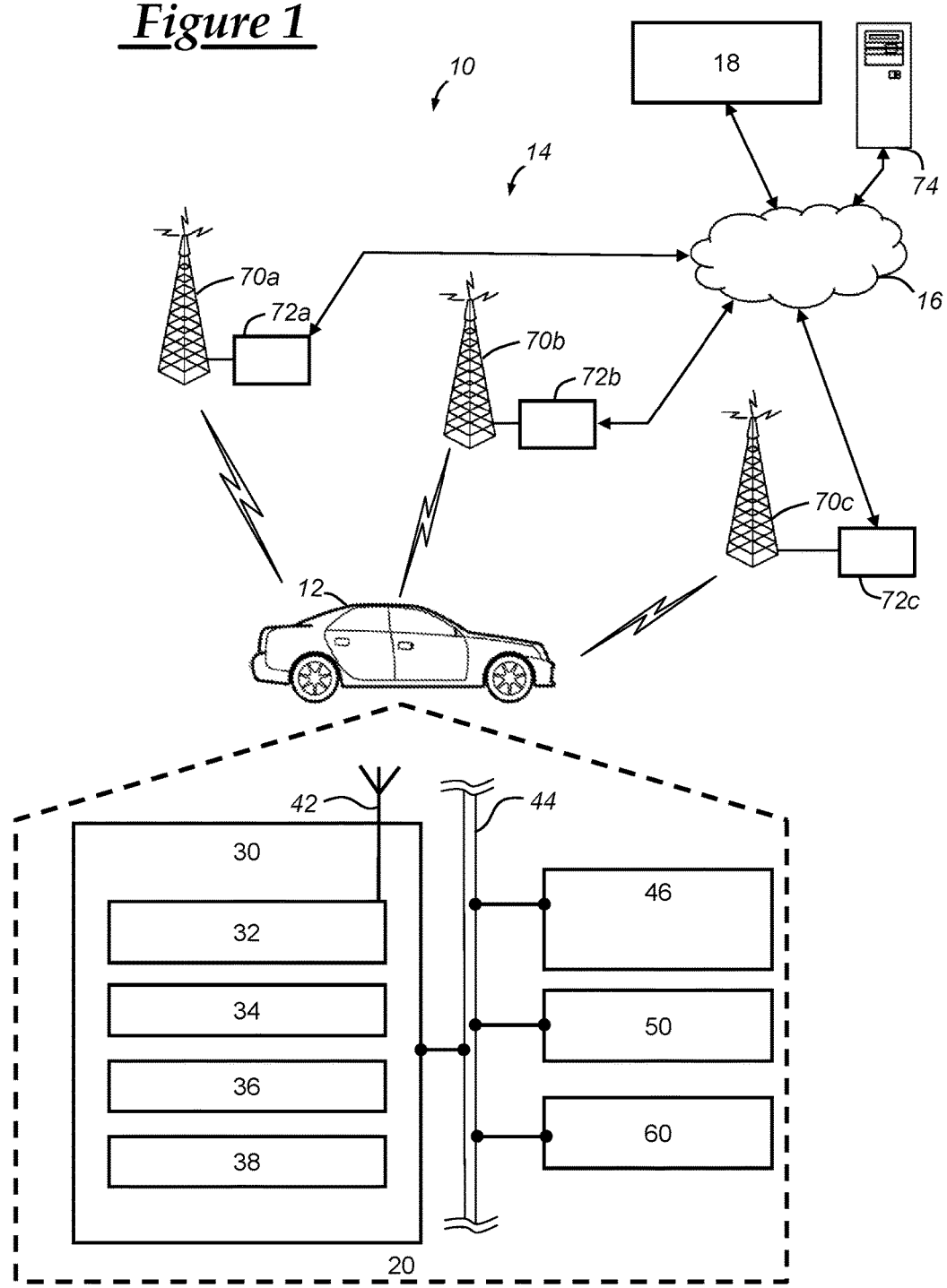

| | | | |
|---|---|---|---|
| 2013/0288687 A1* | 10/2013 | Morioka | H04W 36/08 |
| | | | 455/437 |
| 2014/0334366 A1* | 11/2014 | Hsu | H04W 52/0225 |
| | | | 370/311 |
| 2015/0319744 A1* | 11/2015 | Jung | H04W 24/10 |
| | | | 370/328 |
| 2016/0330654 A1* | 11/2016 | Jung | H04W 48/18 |
| 2017/0006510 A1* | 1/2017 | Kaikkonen | H04H 20/38 |

* cited by examiner

VEHICLE WIRELESS UNIT AND METHOD OF OPERATING THE SAME

FIELD

The present invention generally relates to a method of operating a vehicle cellular communication system and, more particularly, to a method that seeks to connect the vehicle cellular communication system with higher-order radio access technologies (RATs), when such higher-order RATs becomes available.

BACKGROUND

Vehicle communication systems are used in an ever increasing number of vehicle applications and operations, including those pertaining to autonomous and semi-autonomous driving. For instance, many vehicle communication systems include a telematics unit or other type of wireless unit that sends and/or receives data over a cellular network. Most cellular networks support more than one radio access technology (RAT), such as 3G, 4G, LTE, WCDMA, etc., as the large variety of devices within a particular cellular coverage area may require different RATs. Higher-order RATs are usually more prevalent in populous areas, while lower-order RATs are more common in rural areas. Although higher-order RATs may cover less area, they provide faster data transfer and, generally, wireless devices communicating over a cellular network are designed to prefer higher-order RATs when available. This is particularly true when the wireless devices are being used with certain vehicle applications, like those relating to autonomous and semi-autonomous driving, where fast and non-interrupted data transfer over the cellular network is needed.

When a wireless device exits a cellular coverage area of a higher-order RAT, the wireless link is released due to a loss of connection. Most wireless devices are configured to automatically seek and establish connections to lower-order RATs in response to the released wireless link, provided one is available. The converse, however, is not always true. When a wireless device is initially connected via a lower-order RAT and then enters a cellular coverage area also having a higher-order RAT, the wireless link is not released because the lower-order RAT is still available. Cell phones and other personal electronic devices are usually quick to recognize the presence of the higher-order RAT in this situation because they oftentimes are running applications that request data in bursts—a request for data is triggered, for example, via user operation. When the cell phone is not transferring data for a certain amount of time (e.g., in between requests or bursts), there is a natural pause in the data transfer that allows the wireless link with the lower-order RAT to be released in favor of a connection with the higher-order RAT.

The same may not be true, however, for vehicle telematics units and other vehicle wireless devices that require non-interrupted or nearly non-interrupted cellular data transfer for certain operations, like autonomous or semi-autonomous driving operations that rely on GPS/GNSS correction data for precise positioning algorithms. In these situations, there may be no natural pause or break in the data transfer that automatically allows the wireless link with the lower-order RAT to be released and a wireless link with the higher-order RAT to be established. Accordingly, when a vehicle telematics unit engaged in non-interrupted data transfer progresses from a higher-order RAT like 4G to a lower-order RAT like 3G or 2G, the telematics unit may remain in the lower-order RAT for the remainder of the driving session, even if it subsequently reenters a cellular coverage area supporting the higher-order RAT.

The method and system disclosed herein is designed to address such a situation.

SUMMARY

According to one aspect, there is provided a method for operating a vehicle wireless unit, the method comprising the steps of: communicating data between the vehicle wireless unit and a cellular network over a first cellular link according to a first radio access technology (RAT), the data communicated over the first cellular link according to the first RAT is part of a non-interrupted data flow that does not allow the vehicle wireless unit to automatically enter an idle mode on a periodic basis; halting the non-interrupted data flow between the vehicle wireless unit and the cellular network over the first cellular link according to the first RAT so that the vehicle wireless unit enters the idle mode; determining that service according to a second radio access technology (RAT) is available from the cellular network, the second RAT is of a higher order than the first RAT; and establishing a second cellular link between the vehicle wireless unit and the cellular network according to the second RAT when service according to the second RAT is available.

According to another aspect, there is provided a vehicle wireless unit, comprising: a cellular chipset configured for wireless communication with a cellular network; a modem coupled to the cellular chipset; a processor coupled to the cellular chipset; and a memory coupled to the cellular chipset. The vehicle wireless unit is configured to carry out the following steps: communicating data with the cellular network over a first cellular link according to a first radio access technology (RAT), the data communicated over the first cellular link according to the first RAT is part of a non-interrupted data flow that does not allow the vehicle wireless unit to automatically enter an idle mode on a periodic basis; halting the non-interrupted data flow over the first cellular link according to the first RAT so that the vehicle wireless unit enters the idle mode; determining that service according to a second radio access technology (RAT) is available from the cellular network, the second RAT is of a higher order than the first RAT; and establishing a second cellular link with the cellular network according to the second RAT when service according to the second RAT is available.

DRAWINGS

Figure 2:
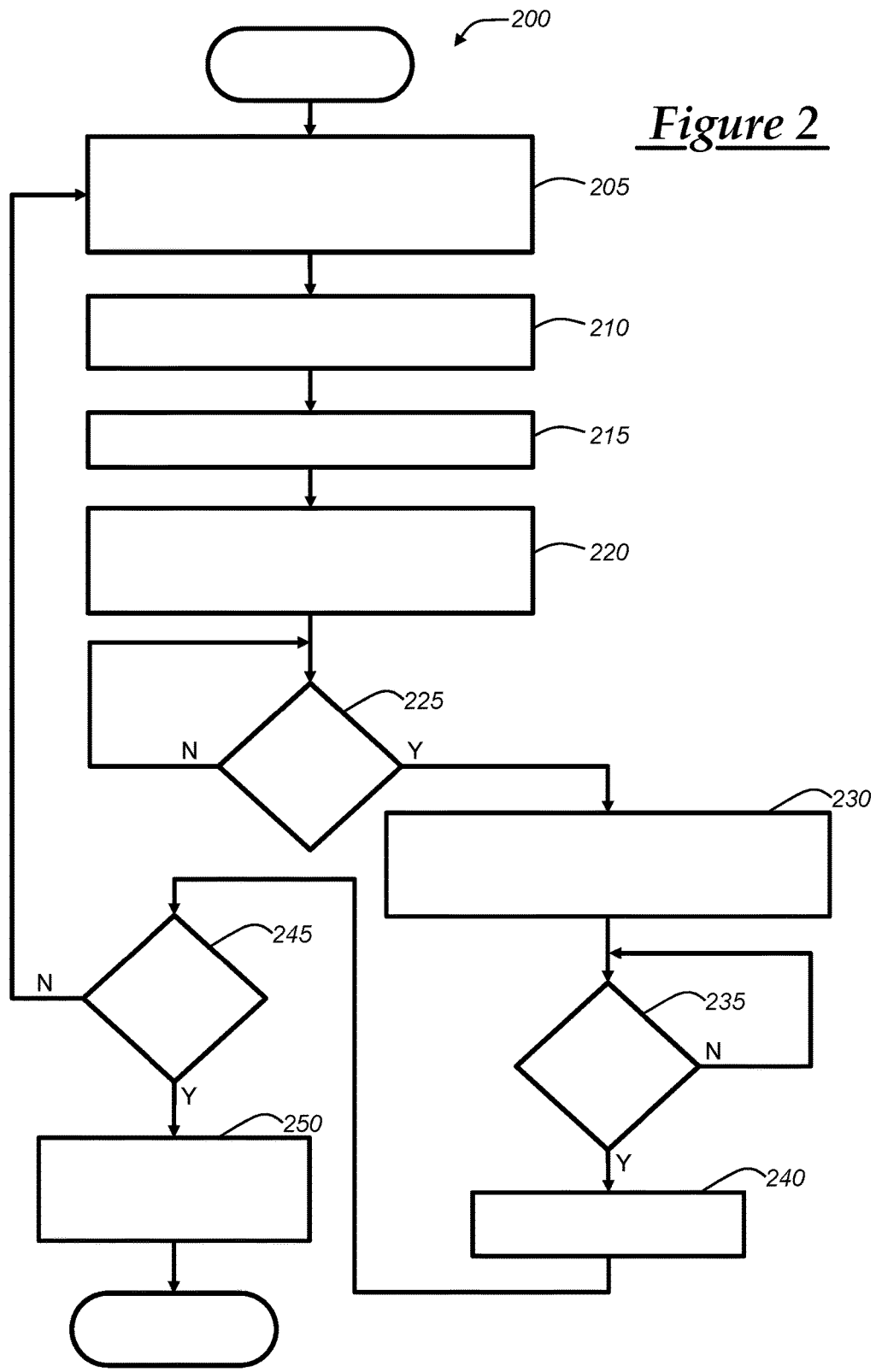

Preferred exemplary embodiments will hereinafter be described in conjunction with the appended drawings, wherein like designations denote like elements, and wherein:

FIG. 1 is a schematic view illustrating a vehicle having a wireless unit that communicates over a cellular network; and FIG. 2 is a flowchart illustrating an exemplary method for operating a vehicle wireless unit, such as the one of FIG. 1.

DESCRIPTION

The method and system described herein are designed for use with a vehicle wireless unit. According to one potential embodiment, the method is at least partially performed by the vehicle wireless unit and is used to handoff packet-switched cellular communications from a lower-order radio access technology (RAT) to a higher-order RAT, even during vehicle operations requiring non-interrupted or nearly non-interrupted data flow, which generally inhibit such a handoff. The method may include the steps of: communicating a non-interrupted data transfer between the vehicle wireless unit and a cellular network over a first cellular link using a first RAT; detecting the presence of a higher-order RAT; halting the non-interrupted data transfer by injecting or inserting a temporary pause or break in the data flow; and establishing a second cellular link with the higher-order RAT.

Consider the example where certain autonomous or semi-autonomous driving applications require a non-interrupted data flow between a remotely located GPS/GNSS (Global Positioning System/Global Navigation Satellite System) corrections server and the vehicle. This data flow may be carried out via a first cellular link using a low-order RAT, such as 3G (third generation). The vehicle may enter an area supported by a higher-order RAT (e.g., 4G (fourth generation)) and the wireless unit may not recognize the presence of the higher-order RAT since the data flow is non-interrupted and, thus, the first cellular link is not released. According to one embodiment, the present method may momentarily halt or suspend the non-interrupted data flow so as to allow the first cellular link to be released and, subsequently, for a second cellular link using a higher-order RAT to be established.

As used herein, a radio access technology (RAT) is a wireless technology that allows for two devices to connect via radio wave communications. A RAT may refer to a specific RAT, such as Long-Term Evolution (4G LTE), or may refer to a class of RATs, such as all of those compliant with a certain telecommunications standard, such as second (2G), third (3G), or fourth (4G) generation of mobile telecommunications technology. The "order" of RATs refers to the ordering of the telecommunications standards, wherein later generations are considered higher-order than older generations (e.g., 4G is a higher-order RAT than 3G) and typically support faster data transfer rates.

Referring now to FIG. 1, there is shown a general and schematic view of an exemplary vehicle communication system 10. System 10 generally includes a vehicle 12, a cellular network 14, a land network 16, and remote facility 18. Vehicle 12 includes vehicle electronics 20, which includes a vehicle wireless unit 30, autonomous controller 46, GPS unit 50, and any number of other vehicle system modules 60. The present system and method may use the vehicle wireless unit 30 to transmit data between one or more components, devices, modules and/or systems in vehicle electronics 20 and the cellular network 14, which in turn is connected to land network 16 and any number of other communication devices, such as remote facility 18.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some or all of the different vehicle electronics 20 may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Vehicle wireless unit 30 may be OEM-installed (embedded) or an aftermarket device that is installed in the vehicle and that enables wireless data communication over cellular network 14. In one exemplary embodiment, the vehicle wireless unit 30 may be a vehicle telematics unit. This unit enables the vehicle to communicate with remote facility 18, computer 74, and any number of other remote devices that may be connected to cellular network 14 and/or land network 16. The wireless unit 30 preferably uses radio transmissions to establish a cellular link with a cell tower 70 so that data communication may be transmitted and received over the cellular link. The vehicle wireless unit may be configured such that it supports multiple RATs, such as third generation RATs (3G) and fourth generation RATs (4G). Thus, the cellular link may be established using any of the one or more supported RATs, provided the RAT is supported in the vehicle's location.

According to one embodiment, vehicle wireless unit 30 utilizes cellular communication according to GSM, CDMA, LTE, VoLTE, or any other suitable standard and thus includes a cellular chipset 32, a modem 34, an electronic processing device 36, one or more digital memory devices 38, and an antenna 42. It should be appreciated that the modem can either be implemented through software that is stored in the telematics unit and is executed by the processor, or it can be a separate hardware component located internal or external to wireless unit 30. The modem can operate using any number of different standards or protocols such as LTE, EVDO, CDMA, GPRS, and EDGE. Wireless networking between the vehicle and other networked devices can also be carried out using wireless unit 30. For this purpose, vehicle wireless unit 30 can be configured to communicate wirelessly according to one or more wireless protocols, including short range wireless communication (SRWC) such as any of the IEEE 802.11 protocols, WiMAX, ZigBee, Wi-Fi direct, Bluetooth, or near field communication (NFC). When used for packet-switched data communication such as TCP/IP, the wireless unit can be configured with a static IP address or can be set up to automatically receive an assigned IP address from another device on the network such as a router or from a network address server.

Autonomous controller 46 may control certain operations of the vehicle, such as by providing torque and/or braking commands. Controller 46 may be used with fully autonomous vehicle systems or may be used with any suitable autonomous or semi-autonomous vehicle systems (e.g., Levels 0-4 of the National Highway Traffic Safety Administration's (NHTSA) scale of vehicle automation). Controller 46 may use information received from GPS unit 50, such as geolocation data (e.g., latitudinal and longitudinal coordinates), and/or information received from a remote facility via wireless unit 30, such as GPS corrections data received from a GPS/GNSS corrections facility 18.

GPS unit or module 50 receives radio signals from a constellation of GPS satellites (not shown). From these signals, the module 50 can determine vehicle position that is used for providing navigation and other position-related services to the vehicle driver. Navigation information can be presented on a vehicle display or can be presented verbally such as is done when supplying turn-by-turn navigation. The navigation services can be provided using a dedicated in-vehicle navigation module (which can be part of GPS module 50), or some or all navigation services can be done via autonomous controller 46 or wireless unit 30, wherein the position information is sent to a remote location for purposes of providing the vehicle with navigation maps, map annotations (points of interest, restaurants, etc.), route calculations, and the like. As mentioned previously, the position information may be continuously or nearly continuously communicated to a GPS/GNSS corrections facility 18. In other embodiments, the position information can be supplied to remote facility 18 or other remote computer system, such as computer 74, for other purposes, such as fleet management. Also, new or updated map data can be downloaded to the GPS module 50 from the remote facility 18 via the wireless unit 30.

Apart from the GPS module 50 and autonomous controller 46, the vehicle 12 can include any number of other vehicle system modules (VSMs) 60 in the form of electronic hardware components located throughout the vehicle. VSMs 60 typically receive input from one or more sensors and use the sensed input to perform diagnostic, monitoring, control, reporting and/or other functions. Each of the VSMs 60 is preferably connected by communications bus 44 to the other VSMs, as well as to the vehicle wireless unit 30, and can be programmed to run vehicle system and subsystem diagnostic tests. As non-limiting examples, one VSM 60 can be an engine control module (ECM) that controls various aspects of engine operation such as fuel ignition and ignition timing in response to signals received from autonomous controller 46, another VSM 60 can be a powertrain control module that regulates operation of one or more components of the vehicle powertrain, and another VSM 60 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors. As is appreciated by those skilled in the art, the above-mentioned VSMs are only examples of some of the modules that may be used in vehicle 12, as numerous others are also possible.

Wireless cellular network 14 may be a cellular carrier system that includes a plurality of cell towers 70*a-c*, one or more mobile switching centers (MSCs) 72*a-c*, as well as any other networking components required to connect cell towers 70 with land network 16, as will be appreciated by those skilled in the art. Each cell tower 70 includes sending and receiving antennas and a base station, with the base stations from different cell towers being connected to the MSC 72 either directly or via intermediary equipment such as a base station controller. Cellular network 14 can implement any suitable communications technology such as second-, third-, or fourth-generation radio access technologies, including, but not limited to, analog technologies such as AMPS, or digital technologies such as LTE, EVDO, CDMA, GPRS, and EDGE. Moreover, a single cell tower 70 may support more than one radio access technology—for example, cell towers 70*b* and 70*c* support both 3G and 4G RATs. As will be appreciated by those skilled in the art, various cell tower/base station/MSC arrangements are possible and could be used with cellular network 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landlines and connects cell towers 70 to remote facility 18, computer 74, as well as numerous other destinations. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 18 need not be connected via land network 16, but could include wireless telephony equipment so that it can communicate directly with a wireless network.

Remote facility 18 is designed to provide the vehicle electronics 20 with a number of different system back-end services. The remote facility 18 may include one or more switches, servers, databases, live advisors, as well as an automated voice response system (VRS), all of which are known in the art. Remote facility 18 may include any or all of these various components and, preferably, each of the various components are coupled to one another via a wired or wireless local area network. Remote facility 18 may receive and transmit data via a modem connected to land network 16. The remote facility may be a GPS/GNSS (Global Positioning System/Global Navigation Satellite System) corrections facility. Through cellular system 14, the GPS/GNSS corrections facility may communicate with the vehicle wireless unit 30 such that enhanced geolocation data may be received at the vehicle and used, for example, for autonomous driving.

Referring now to FIG. 2, there is shown an exemplary embodiment of a method for operating a vehicle wireless unit. The following exemplary method steps will be discussed, with reference to the following scenario: vehicle 12, having established a first cellular link with cell tower 70*a* using a first RAT (3G) (see steps 205 to 220), thereafter enters an area with a higher-order RAT (4G).

The method begins with step 205, wherein a first cellular link according to a first radio access technology (RAT) is established. In one embodiment, vehicle 12 may seek to establish a cellular connection such that one or more vehicle modules may provide data to and/or receive data from a remote facility, such as a GPS/GNSS corrections facility 18. The vehicle wireless unit 30 may detect the presence of cell tower 70*a* through reception of a cell signal at antenna 42. Then, wireless unit 30 may engage in communications with cell tower 70*a* using cellular chipset 32 to establish a first cellular link with the cell tower 70*a* over a first RAT, such as 3G. The cellular chipset 32 may operate according to known cellular technologies, such as CDMA, GSM, etc., or any other suitable cellular technologies.

In one embodiment, step 205 may be carried out in response to the starting of vehicle 12. In another embodiment, step 205 may be carried out after the vehicle terminates a cellular link over another RAT due to a loss of signal. In yet another embodiment, step 205 may be carried out when an operator of the vehicle enables cellular communications and/or when cellular communications are necessary to carry out operation of the vehicle. In any event, after the first cellular link is established in step 205, the method continues to step 210.

In step 210, the vehicle wireless unit 30 establishes a data communication link (e.g., a transport layer communications link via TCP/IP) with a remote server, such as remote facility 18. A modem may be located in the wireless unit 30, and may be a separate hardware device located therein or merely software instructions located on memory 38 and carried out by processor 36. The modem can be used to package and reassemble TCP/IP packets for data transmission to and from the remote facility 18. Additionally, or alternatively, a TCP/IP link may be established with a computer 74 via operation of the wireless unit 30 and/or a modem contained therein.

At step 215, a timer is reset and/or initiated. The timer acts as a triggering event such that, when it is triggered (e.g., when it expires), the non-interrupted data flow between, for example, vehicle wireless unit 30 and GPS/GNSS corrections facility is suspended to allow the first cellular link over the first RAT to be released. As previously mentioned, the cellular service provider will not direct the wireless unit 30 to release the first cellular link until the communications between the wireless unit 30 and the cellular network have ceased for a minimum amount of time. Thus, if there is a non-interrupted data flow between the vehicle and the remote facility 18, the cellular service provider will not direct the wireless unit 30 to disconnect such that it may search for other RATs. The timer, or other triggering event, functions to introduce a break into the non-interrupted data flow such that communications between the wireless unit 30 and the cellular network 14 cease for a certain time (e.g., a certain minimum time that may be specified by the protocol under which the first RAT operates) thereby allowing the first cellular link to terminate.

It should be appreciated that different indicators may be used by cellular service providers or certain RATs that prompt the cellular chipset to release the cellular link other than the realization of the passage of a certain amount of time, as indicated above. In any event, the termination of the cellular link allows the vehicle wireless unit 30 to then scan for a higher-order RAT (e.g., 4G in this case) and, if found, to connect to the higher-order RAT (see steps 240-250). Step 215 may be carried out before step 205 and/or step 210, or may be carried out concurrently therewith.

The timer of step 215 may simply be a set of software instructions that are stored in memory 38 and executed in processor 36. Resetting the timer may merely comprise of resetting a single timestamp value in memory 38 or RAM of processor 36. In other embodiments, a different triggering event may be used to initiate the process of releasing the first cellular link and scanning for a higher-order RAT. Thus, if a different triggering event is being used, then the trigger may be re-initialized, if necessary. Such other triggers may include receiving a signal via vehicle-to-vehicle (V2V) communications from a nearby vehicle indicating the presence of cell towers in the areas supporting certain RATs; detection that the vehicle is located in an area that previously used a higher-order RAT; use of vehicle GPS location and cellular tower map to determine whether a cell tower supporting a higher-order RAT within range; etc. As implicated, the triggering event may depend on the probability that a higher-order RAT is supported at the vehicle's current location. Or, the triggering event may be arbitrary, such as is the case with the timer.

In step 220, communication of a non-interrupted data flow using the first cellular link is carried out. As used herein, a "non-interrupted data flow" broadly includes any data communication over a cellular link wherein the cellular data communication is continuous or near-continuous to an extent that it does not have normal interruptions sufficient enough to cause the cellular link to be released. Releasing of the cellular link is usually commanded or directed by the cellular service provider after an interruption or period of cellular data communication inactivity that extends for a certain amount of time. Thus, a "non-interrupted data flow" is sufficiently continuous such that the underlying cellular link is not naturally or periodically released due to cellular data communication inactivity.

Cellular phones and other personal cellular devices are primarily user-responsive and, thus, commonly experience cellular data inactivity thereby allowing for the cellular link to release. Contrarily, many vehicles now come equipped with electronic devices that utilize near-continuous data streams (i.e., non-interrupted data flows), which may be particularly useful with autonomous or semi-autonomous driving features. Although personal cellular devices, such as cell phones, may be capable of carrying out non-interrupted data streams, such operation is undesirable because of the amount of relative battery power required to carry out these non-interrupted data streams. Moreover, many cellular service providers charge over-usage fees if the personal cellular device uses more data than it has been allocated and, thus, it is highly desirable to limit the data usage of these personal cellular devices. These devices may minimize data usage through only requesting data (or receiving data) when the user of the device indicates their desire to obtain such data.

In one embodiment of step 220, the non-interrupted data flow may include communication of GPS/GNSS information (including coordinates obtained by the vehicle, and correctional coordinates and other information received from the GPS/GNSS corrections facility) between the vehicle wireless unit 30 and the GPS/GNSS corrections facility 18. The GPS coordinates received at the vehicle via GPS 50 may be inaccurate for various reasons, such as atmospheric signal interference, receiver noise, ephemeris errors, signal obstruction and reflection, etc. GPS/GNSS servers located at, for example, computer 74 or remote GPS/GNSS corrections facility 18 may use augmentation techniques to provide more accurate GPS information, which may prove crucial in the operation of autonomous or semi-autonomous vehicles. In another embodiment, the non-interrupted data flow may include communication of voice data (e.g., VoIP), the communication of navigation information, WiFi hotspot diagnostics, etc.

Step 225 is an example of an embodiment where the method monitors a triggering event, such as the expiration of a timer. The timer may be executed via processor 36, as described above, and upon detection of the expiration of the timer by the processor, the method may continue to step 230.

In step 230, the non-interrupted data flow between the vehicle wireless unit 30 and the cellular network 14 over the first cellular link is halted so that the vehicle wireless unit can enter an idle mode. The halting may consist of halting the flow of data at the transport protocol layer, which includes terminating the TCP/IP link with the remote facility 18. The termination of this TCP/IP link will cause the non-interrupted data flow of the GPS/GNSS data to cease. All other TCP/IP links that are established over the first cellular link shall be terminated in a like manner. Upon termination of these connections and, thus, the subsequent halting of the non-interrupted data flow, the vehicle wireless unit 30 enters an idle mode. An idle mode consists of a mode wherein the vehicle wireless unit 30 does not carry out any cellular communication for a certain amount of time such that the cellular service provider directs the cellular chipset 32 to release the current cellular link—e.g., the first cellular link. Then, in step 235, the vehicle remains in the idle mode and waits for the cellular service provider to command the wireless cellular chipset 32 to release the first cellular link.

After the non-interruptive data flow has been suspended for a sufficient amount of time to enter the idle mode and, thus, the first cellular link is released, step 240 is carried out. In step 240, the cellular chipset 32 of the vehicle wireless unit 30 scans for a higher-order RAT. The vehicle wireless unit 30 scans by searching for a servicing cell tower 70 that supports a higher-order RAT, such as 4G. Here, the higher-order RAT is any radio access technology that is higher in order than the first RAT used in the first cellular link. For example, if the first RAT was 3G, then the wireless cellular unit 30 would scan for 4G, 5G, etc. In step 245, if a higher-order RAT is found, the method continues to step 250; otherwise, the method continues to step 205 wherein the first cellular link according to the first RAT is established.

In step 250, a second cellular link between the vehicle wireless unit and the cellular network according to a second RAT is established. The second RAT is a higher-order RAT that was found in step 245. In one example, the higher-order RAT may be 4G or 4G LTE. After establishment of the second cellular link, a TCP/IP connection may be established, similar to the TCP/IP connection that was established in step 210. Subsequently, the non-interrupted data flow may resume and, accordingly, communications between the autonomous controller 46 and the GPS/GNSS corrections facility may resume via the vehicle wireless unit 30 and cellular network 14. The method then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a vehicle wireless unit, the method comprising the steps of:
   communicating data between the vehicle wireless unit and a cellular network over a first cellular link according to a first radio access technology (RAT), the data communicated over the first cellular link according to the first RAT is part of a non-interrupted data flow that does not allow the vehicle wireless unit to automatically enter an idle mode on a periodic basis;
   halting the non-interrupted data flow between the vehicle wireless unit and the cellular network over the first cellular link according to the first RAT so that the vehicle wireless unit enters the idle mode;
   determining that service according to a second radio access technology (RAT) is available from the cellular network, the second RAT is of a higher order than the first RAT; and
   establishing a second cellular link between the vehicle wireless unit and the cellular network according to the second RAT when service according to the second RAT is available;
   wherein the communicating step further comprises communicating data between the vehicle wireless unit and the cellular network by establishing a data communication link with a GPS/GNSS corrections facility and communicating GPS/GNSS corrections data between the vehicle wireless unit and the GPS/GNSS corrections facility over the first cellular link according to the first radio access technology (RAT), wherein the GPS/GNSS corrections data communicated over the first cellular link according to the first RAT is part of the non-interrupted data flow.

2. The method of claim 1, wherein the GPS/GNSS corrections data includes location coordinates obtained by a GPS unit on the vehicle and correctional information provided by the GPS/GNSS corrections facility.

3. The method of claim 1, wherein the halting step further comprises initiating or resetting a timer in the vehicle wireless unit, monitoring the timer, and suspending the non-interrupted data flow between the vehicle wireless unit and the cellular network when the timer expires.

4. The method of claim 3, wherein the halting step further comprises continuing to suspend the non-interrupted data flow between the vehicle wireless unit and the cellular network for a minimum amount of time, and releasing the first cellular link at the vehicle wireless unit following the minimum amount of time.

5. The method of claim 1, wherein the halting step further comprises receiving signals indicating that a vehicle is within range of one or more cellular towers that support a higher-order RAT, and suspending the non-interrupted data flow between the vehicle wireless unit and the cellular network after the signals are received.

6. The method of claim 5, wherein the signals are received at the vehicle wireless unit via vehicle-to-vehicle (V2V) communications from a nearby vehicle and indicate that the vehicle is within range of one or more cellular towers that support the higher-order RAT.

7. The method of claim 5, wherein the signals are received at the vehicle wireless unit from a GPS unit and a cellular tower map and indicate that the vehicle is within range of one or more cellular towers that support the higher-order RAT.

8. The method of claim 5, wherein the signals are received at the vehicle wireless unit from a memory device located on the vehicle and indicate that the vehicle is within range of one or more cellular towers that previously supported the higher-order RAT.

9. The method of claim 1, wherein the halting step further comprises terminating a TCP/IP link between the vehicle wireless unit and the cellular network, causing the vehicle wireless unit to enter the idle mode, receiving instructions from the cellular network to release the first cellular link, and releasing the first cellular link.

10. The method of claim 1, wherein the determining step further comprises using the vehicle wireless unit to search for a cellular tower that supports a RAT that is of a higher order than the first RAT, and determining that the higher order RAT is the second RAT if found.

11. The method of claim 1, wherein the establishing step further comprises establishing the second cellular link between the vehicle wireless unit and the GPS/GNSS corrections facility according to the second RAT and communicating GPS/GNSS corrections data between the vehicle wireless unit and the GPS/GNSS corrections facility over the second cellular link according to the second radio access technology (RAT).

12. The method of claim 1, further comprising the step:
reestablishing another cellular link between the vehicle wireless unit and the cellular network according to the first RAT when service according to the second RAT is unavailable.

13. The method of claim 1, wherein the data communicated over at least one of the first or second cellular links includes GPS/GNSS corrections data configured to support an autonomous or semi-autonomous driving application.

14. A vehicle wireless unit, comprising:
- a cellular chipset configured for wireless communication with a cellular network;
- a modem coupled to the cellular chipset;
- a processor coupled to the cellular chipset; and
- a memory coupled to the cellular chipset, where the vehicle wireless unit is configured to carry out the following steps:

communicating data with the cellular network over a first cellular link according to a first radio access technology (RAT), the data communicated over the first cellular link according to the first RAT is part of a non-interrupted data flow that does not allow the vehicle wireless unit to automatically enter an idle mode on a periodic basis;

halting the non-interrupted data flow over the first cellular link according to the first RAT so that the vehicle wireless unit enters the idle mode;

determining that service according to a second radio access technology (RAT) is available from the cellular network, the second RAT is of a higher order than the first RAT; and establishing a second cellular link with the cellular network according to the second RAT when service according to the second RAT is available;

wherein the vehicle wireless unit is further configured to communicate data with the cellular network by establishing a data communication link with a GPS/GNSS corrections facility and communicating GPS/GNSS corrections data between the vehicle wireless unit and the GPS/GNSS corrections facility over the first cellular link according to the first radio access technology (RAT), wherein the GPS/GNSS corrections data communicated over the first cellular link according to the first RAT is part of the non-interrupted data flow.

* * * * *